United States Patent [19]
Skinner

[11] Patent Number: 5,936,246
[45] Date of Patent: Aug. 10, 1999

[54] PORTABLE RADIATION DETECTOR

[75] Inventor: Susan M. Skinner, Summertown, Tenn.

[73] Assignee: S. E. International, Inc., Summertown, Tenn.

[21] Appl. No.: 08/898,231

[22] Filed: Jul. 22, 1997

[51] Int. Cl.$^6$ .............................. G01T 1/167; G01T 7/00
[52] U.S. Cl. .................................... 250/336.1; 250/491.1; 250/522.1
[58] Field of Search ................................ 250/336.1, 393, 250/491.1, 522.1

[56] References Cited

U.S. PATENT DOCUMENTS

| | | | |
|---|---|---|---|
| 3,419,720 | 12/1968 | Debye et al. | 250/337 |
| 4,695,728 | 9/1987 | Gibes | 250/336.1 |

OTHER PUBLICATIONS

Radiation Alert® Inspector Radiation Monitor, p. 7, S.E. International's product brochure entitled Radiation® Alert Quality Handheld Detectors.

*Primary Examiner*—Constantine Hannaher
*Assistant Examiner*—Darren M. Jiron
*Attorney, Agent, or Firm*—Waddey & Patterson; Mark J. Patterson

[57] ABSTRACT

A plate for positioning a radiation test wipe in alignment with a sensor on a radiation monitoring instrument includes a recessed mounting area on the plate that conforms to the geometry of the wipe. Guide members on the plate slidably engage brackets attached to a back panel of the instrument. The plate is therefore removable and can slide into a position along the instrument where it contacts a slide stop integral to the brackets. This causes the test wipe to be aligned directly under the sensor to provide consistent readings.

3 Claims, 3 Drawing Sheets

PORTABLE RADIATION DETECTOR

BACKGROUND OF THE INVENTION

The present invention relates generally to portable and handheld radiation detection devices. More particularly, this invention pertains to wipe test plates which are used to position a radiation monitoring wipe or disk proximate the detector on a portable radiation monitor.

Portable and handheld radiation monitoring instruments are used in a wide number of diverse applications to measure the level of alpha, beta, gamma, and x-ray radiation in the proximity of the instrument. Persons working in occupations where they are possibly exposed to radiation from medical and environmental hazards are required to monitor for radioactive surface contamination to ensure the safety of personnel, determine if their exposure is within established limits, and prevent the spread of contamination. A typical art approach to monitoring occupational exposure to radiation from surface contamination is to have a worker perform a smear or "wipe" test. This test consists of wiping a surface to be checked, such as a countertop, floor, equipment, etc. with a wipe which is typically a circular disc of cotton or filter paper and then measuring the accumulation of any radioactivity accumulated on or attached to the wipe. This typically small amount of radioactivity must have a prolonged measurement by a radiation monitor.

It is convenient to use a portable handheld GM (Geiger-Mueller) type detector to perform this measurement. The GM type that is required must have a very thin circular glass window. The wipe should be placed directly adjacent to the window of the GM while an accumulating count is performed over a chosen time period. The final measurement is determined by a calculation of the reading from the instrument, the distance of the instrument from the wipe, and the measurement time period.

The distance or geometry of the wipe to the GM window and the positioning of the wipe precisely adjacent to the window is critical. For example, if the wipe is positioned so a portion of the wipe is not in a direct line to the window, the radioactivity contained on the part of the wipe that is not aligned with the window may not be detected and may give an artificially low reading on the instrument. In addition, if the distance from the window to the wipe is only estimated, this also can result in a miscalculation and incorrect final measurement.

Unfortunately, there has been no design developed in the prior art that allows the owner of a portable or handheld radiation monitoring instrument to easily and consistently correctly position a wipe adjacent to the GM window on the instrument. Consequently, the user of the instrument must carefully manipulate the wipe trying to visualize and estimate the position and distance of the wipe to the window, a procedure that can be time consuming and inaccurate and produce radiation exposure risks to personnel.

What is needed, then, is device that assists the user of a portable radiation monitor in accurately and consistently positioning a wipe adjacent and at a known distance to the GM window on the instrument without significantly adding to the cost or complexity of the instrument.

SUMMARY OF THE INVENTION

The problem of assuring consistent and accurate positioning of a radiation wipe or disk over the sensor on a portable or handheld radiation monitor is solved in the present invention by use of a wipe test plate that slides into position across the back panel of the monitoring instrument. The wipe is placed in a wipe mount formed in the front surface of the plate. The plate has left and right side walls that each incorporate a bracket retaining member that slidably engage plate mounting brackets that are attached along the left and right sides of the back panel of the monitoring instrument. The mounting brackets are mounted and positioned over the back panel of the instrument so that a small gap is left between the bottom edge of the brackets and the panel.

The bracket retaining members fit within the gaps so that the plate can slide downward along the brackets from the top of the instrument towards the bottom. The brackets act like rails to restrain movement of the plate laterally deft or right) or away from the back panel of the monitoring instrument. Slide stops are formed in the bottom ends of the brackets such that the bracket retaining members contact the stops—and thereby prevent further downward sliding movement of the plate—when the wipe mount is positioned directly beneath the radiation window in the back of the instrument. This accurately and consistently positions the wipe directly beneath the radiation sensor of the instrument for each reading. The wipe plate can then easily be removed by sliding it upward until the bracket retaining members of the plate disengage the brackets mounted on the instrument. Once removed, the wipe test plate can be decontaminated, if necessary. Without the plate, the instrument is then usable for general surveying.

Preferably, the brackets are mounted to the back of the radiation monitoring instrument using the same mounting holes that are used to attach the back panel of the instrument to the instrument housing.

DESCRIPTION OF THE PREFERRED EMBODIMENTS

Figure 1:
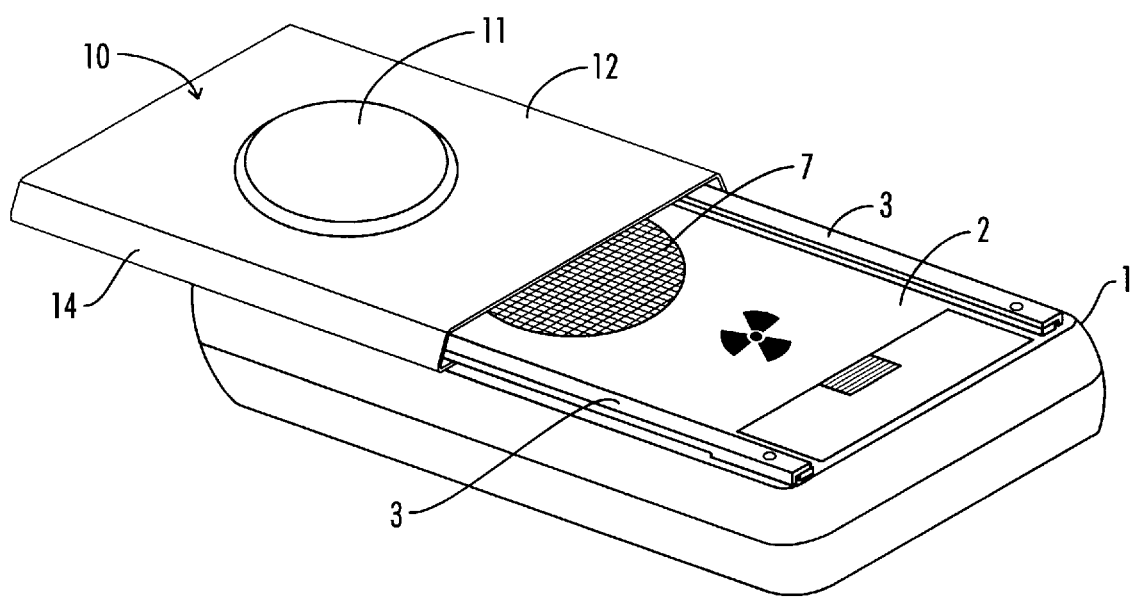
FIG. 1 is a perspective view of the wipe test plate of this invention shown partially engaged on a handheld radiation monitoring instrument.

FIG. 1 shows the wipe test plate 10 of this invention in a position where it is partially slidably engaged with plate mounting brackets 3 attached to the back panel 2 of radiation monitor 1. Radiation monitor 1 is a conventional portable or handheld radiation monitoring instrument used for general radiation surveying or radiation decontamination. Typically, radiation monitor 1 will have a radiation sensor 6 positioned within the housing of radiation monitor 1 so that the radiation sensor 6 is directly below a radiation transparent window 7.

The wipe test plate 10 is shown in greater detail in FIGS. 3–6. Preferably wipe test plate 10 is fabricated from stainless steel or other metal that is easy to decontaminate. An annular sloped wall 13 is formed on the front surface 16 of wipe test plate 10 to define a circular depression or wipe mount 11. Preferably, the circumference of wipe mount 11 will be set so that it will conform to the size and shape of a conventional disk shaped wipe. The position of wipe mount 11 on plate top surface 12 of wipe test plate 10 is such that when wipe test plate 10 is fully slidably engaged on plate mounting bracket 3, wipe mount 11 and therefore wipe W is between the plate 10 and back panel 2, directly beneath radiation window 7 and therefor sensor 6.

Figure 4:
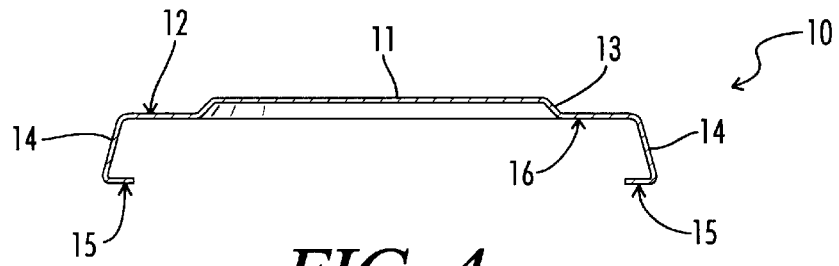
FIG. 4 is a sectional end view of the wipe test plate through line AA of FIG. 3.
Figure 3:
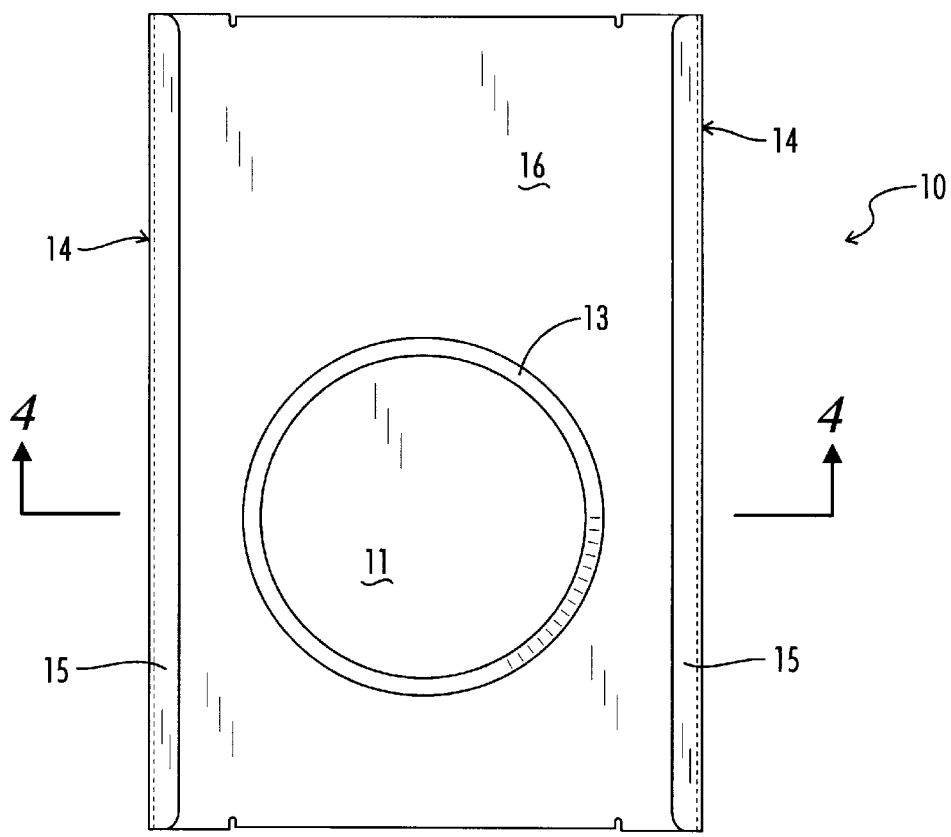
FIG. 3 is a plan view of the wipe test plate of this invention, looking from the rear surface of the plate.
Figure 5:
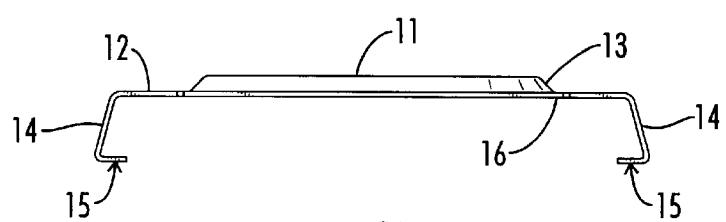
FIG. 5 is a top end view of the wipe test plate of FIG. 3.

As seen on FIGS. 4 and 5, the side walls 14 of wipe test plate 10 are sloped outwardly and down. Plate side walls 14 are then turned inward to define a pair of bracket engaging guide members 15 which are parallel to plate rear surface 16 and front panel 2 when wipe test plate 10 is slidably attached to plate mounting brackets 3.

Figures 6, 7:
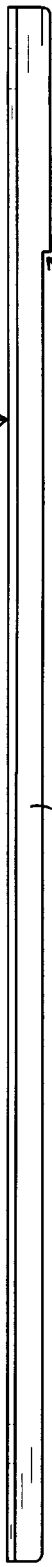
FIG. 6 is a plan view of a plate mounting bracket used to mount the wipe test plate of this invention to the handheld radiation monitoring instrument shown in FIG. 1.
FIG. 7 is a side view of the plate mounting bracket of FIG. 6.

Looking at FIGS. 6 and 7, the plate mounting brackets 3 are shown in greater detail. The top wall 4 of each plate mounting bracket 3 has a pair of screw holes 8 so that plate mounting bracket 3 can be attached to the back panel 2 of radiation monitor 1. Preferably, the screw holes 8 are oriented so that they are aligned over the screw holes (not shown) that secure the back panel 2 of radiation monitor 1 to the instrument housing. Accordingly, the plate mounting brackets 3 can easily be attached to and removed without modifying radiation monitor 1.

Figure 2:
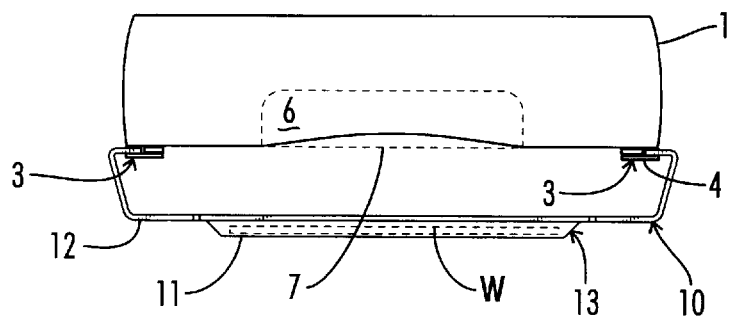
FIG. 2 is a top end view of the combination of the wipe test plate and handheld monitoring instrument of FIG. 1.

FIG. 7 shows the side wall 5 of each plate mounting bracket 3. A slide stop 9 is formed in the lower end of side wall 5. The leading edge of each slide stop 9 is placed at a position along side wall 5 so that the leading edges of guide members 15 of wipe test plate 10 (FIG. 5) will engage it and stop downward movement of wipe test plate 10 when wipe mount 11 is directly beneath radiation window 7 and sensor 6 (FIG. 2). The remaining portion of side wall 5 of each plate mounting bracket 3 is slightly recessed from slide stop 9 so that a corresponding guide member 15 (FIG. 5) can slide underneath.

It will be apparent to those skilled in the art that the plate mounting brackets 3 act as a rail for plate side walls 14 and guide members 15 of wipe test plate 10 (FIG. 5), allowing sliding movement of wipe test plate 10 up and down plate mounting brackets 3 but preventing movement left and right or away from the back panel 2 of radiation monitor 1. Consequently, when a wipe W is placed in wipe mount 11, and wipe test plate 10 is properly engaged with plate mounting brackets 3 mounted to rear panel 2 of radiation monitor 1, wipe W will be suspended in a tray-like fashion directly beneath radiation window 7 and radiation sensor 6, resulting in consistent and accurate monitoring and measurement of the radioactivity on the wipe.

Thus, although there have been described particular embodiments of the present invention of a new and useful Removable Wipe Test Plate for a Portable Radiation Detector, it is not intended that such references be construed as limitations upon the scope of this invention except as set forth in the following claims.

What is claimed is:

1. A slate for positioning a radiation test wipe proximate a radiation sensor on a portable radiation monitoring instrument comprising:

a. a plate having a wipe mount to receive and support the test wipe in a fixed position on a front surface of the plate;

b. the plate having guide members adapted to slidably engage a panel of the instrument so that the test wipe can be manually placed in a pre-determined position directly adjacent to the radiation sensor;

c. wherein the guide members include a leading edge to restrict further sliding movement along the panel of the instrument when the test wipe is in the pre-determined position adjacent to the radiation sensor; and d. wherein the wipe mount comprises a depressed area in the front surface of the plate and having a shape that conforms to a pre-determined shape of the test wipe.

2. A system for consistently positioning a radiation test wipe proximate a radiation sensor on a portable radiation monitoring instrument comprising:

a. a slate having a wipe mounting area on the plate;

b. plate mounting brackets attached to the monitoring instrument; and c. the plate including guide members that engage the plate mounting brackets to position the wipe mounting area proximate the radiation sensor;

d. a slide stop that contacts a portion of the plate to indicate when the wipe mounting area is in a pre-determined preferred position proximate the radiation sensor;

e. wherein the plate brackets comprise rails attached along left and right sides of a back panel of the instrument;

f. wherein the guide members are formed integral to side walls on the plate and wherein the guide members slidably engage the rails so that the plate can be mounted to and removed from the instrument by sliding the plate downward and upward along the rails parallel to the back panel of the instrument; and g. wherein the slide stop is formed integral to at least one of the rails.

3. The system of claim 2 wherein the slide stop comprises a leading edge formed in a lower end of at least one rail and wherein the rails are attached to the instrument to create a gap between rails and the back panel of the instrument to receive the guide members.

* * * * *